(12) United States Patent
Conus et al.

(10) Patent No.: US 8,484,484 B2
(45) Date of Patent: Jul. 9, 2013

(54) METHOD OF SENDING AN EXECUTABLE CODE TO A RECEPTION DEVICE AND METHOD OF EXECUTING THIS CODE

(75) Inventors: Joël Conus, Essertines-sur-Yverdon (CH); Luca Gradassi, Prilly (CH)

(73) Assignee: Nagravision SA, Cheseaux-sur-Lausanne (CH)

( * ) Notice: Subject to any disclaimer, the term of this patent is extended or adjusted under 35 U.S.C. 154(b) by 648 days.

(21) Appl. No.: 12/452,567

(22) PCT Filed: Jul. 9, 2008

(86) PCT No.: PCT/EP2008/058937
§ 371 (c)(1),
(2), (4) Date: Jan. 8, 2010

(87) PCT Pub. No.: WO2009/007403
PCT Pub. Date: Jan. 15, 2009

(65) Prior Publication Data
US 2010/0138636 A1    Jun. 3, 2010

(30) Foreign Application Priority Data

Jul. 10, 2007 (EP) .................................. 07112160

(51) Int. Cl.
*G06F 21/00* (2006.01)
(52) U.S. Cl.
USPC .......................................... 713/189; 713/193
(58) Field of Classification Search
None
See application file for complete search history.

(56) References Cited

U.S. PATENT DOCUMENTS

| | | | |
|---|---|---|---|
| 2002/0138702 A1* | 9/2002 | Gefen et al. | 711/154 |
| 2002/0184654 A1 | 12/2002 | Jeong | |
| 2004/0250094 A1 | 12/2004 | Bacon | |
| 2006/0230190 A1* | 10/2006 | Moon | 710/8 |

FOREIGN PATENT DOCUMENTS

| | | |
|---|---|---|
| EP | 1256042 | 7/2005 |
| EP | 1256042 B1 * | 7/2005 |

OTHER PUBLICATIONS

International Search Report.

* cited by examiner

*Primary Examiner* — Jeffrey Pwu
*Assistant Examiner* — Helai Salehi
(74) *Attorney, Agent, or Firm* — Harness, Dickey & Pierce, P.L.C.

(57) ABSTRACT

One embodiment of the present invention discloses a process for sending an executable code to a security module locally connected to a receiving device. This security module comprises a microcontroller and a memory, the memory including at least one executable area provided to contain instructions suitable to be executed by the microcontroller, and at least one non-executable area, wherein the microcontroller cannot execute the instructions. The process includes dividing the executable code into blocks; adding at least one block management code to the blocks in order to create an extended block; introducing the content of an extended block into a message to be processed in the receiving device, in such a way that the whole executable code is contained in a plurality of messages; and sending a message to the receiving device, this message containing one of the extended blocks different from the first extended block.

16 Claims, 4 Drawing Sheets

US 8,484,484 B2

METHOD OF SENDING AN EXECUTABLE CODE TO A RECEPTION DEVICE AND METHOD OF EXECUTING THIS CODE

TECHNICAL DOMAIN

The present invention relates to the sending of an executable code to a receiving device including a security module, as well as the processing and execution of this code in a security module including a microcontroller associated with a memory. More precisely, the invention aims at maximally limiting the size necessary for the executable part of the memory, allowing at the same time the execution of large size programs.

In particular, this invention can be applied to a security module used in the domain of conditional access television.

PRIOR ART

A part of the presently existing security modules have a memory of at least one of the three following types: a RAM, ROM or EEPROM memory. Generally, the RAM memory is divided into two parts. One of the parts, named the executable memory, can contain an executable code, and the other part, named the non-executable memory, is such that the code execution is not allowed.

In particular, in the memories of security modules, providing a large executable memory involves security problems. Indeed, the inappropriate execution of a code by an ill-intentioned person may sometimes reveal information contained in the security module, which is supposed to remain secret. In particular, such information can be decryption keys. The knowledge of such keys may allow, for instance, the use of conditional access content.

In order to avoid that such secret information is revealed, it is desirable to choose a small executable memory. The drawback of this choice is that it is not possible to store an executable program having a size larger than the size of the executable memory, thus limiting the size of programs. A compromise should thus be done between the security associated with the size of the memory and the choice of executable programs that can be stored.

The document D1 (EP 1 256 042) describes a process wherein an executable program is transmitted to a device such as, for instance, a Pay-TV decoder. In this process, the executable program is divided into blocks, the blocks being then transmitted to the decoder. The latter contains two processors. One of these processors, to which the received messages are transmitted, is a secure processor for verifying the integrity and authenticity of the blocks. Countermeasures can be taken in case of an incorrect block. If the integrity and authenticity are correct, the block can be transferred to a memory for storage or to another processor which executes the instructions contained in this block.

This document does not give indications concerning the size of the executable memory of the processor. It only describes a verification step previous to the execution of a code. Thereby, it does not solve the problem of the prior art. Indeed, nothing prevents from using an authentic executable code, i.e. having successfully passed the steps of authenticity and integrity verification, and from inappropriately executing this code. This inappropriate execution could give useful indications to an ill-intentioned person, even very useful as this is a true code.

The present invention aims at avoiding the drawbacks of the prior art devices by providing a memory, wherein the size of the executable memory is small, so that security is great, allowing at the same time the execution of large size programs, in particular having a size larger than the executable memory.

SUMMARY OF THE INVENTION

The aim of the invention is achieved by means of a process for sending an executable code to a security module locally connected to a receiving device, this security module including a microcontroller and a memory, said memory including at least one executable area provided to contain instructions likely to be executed by said microcontroller, and at least one non-executable area, wherein the microcontroller cannot execute the instructions, characterized by including the steps of:

a) dividing the executable code into blocks;
b) adding at least one block management code to said blocks in order to create an extended block, this extended block having a size at the most equal to that of the executable area of the memory;
c) introducing the content of an extended block into a message of the type to be processed in the receiving device, so that the whole executable code is contained in a plurality of messages;
d) sending a message to the receiving device, this message containing one of the extended blocks different from the first extended block, the first extended block containing the start of an executable program;
e) processing said message in order to extract its extended block;
f) storing the executable code and said at least one management code of a received block in the executable area of the memory;
g) executing at least one management code of said extended block, this management code having the effect of transferring the block content in a non-executable area of the memory;
h) repeating steps d) to g) until all the extended blocks are stored in said non-executable area of the memory, which is non-executable except for the first block;
i) sending a message containing the first extended block to the receiving device;
j) processing said message in order to extract its extended block;
k) storing the executable code of the received block in the executable area of the memory.

The aim of the invention is also achieved by means of a process for the execution of an executable code by a security module locally connected to a receiving device, this security module including a microcontroller and a memory, said memory including at least one executable area provided to contain instructions likely to be executed by said microcontroller, and at least one non-executable area, wherein the microcontroller cannot execute the instructions, said executable code being sent according to the above described process, characterized by including the following steps:

a) execution of the executable code stored in the executable area of the memory;
b) execution of at least one management code having the effect of transferring a block from the non-executable memory to the executable memory, this block being the block following the block under execution;
c) repeating steps a) and b) until the execution of the code is terminated.

According to this invention, the maximum size of the executable program is independent of the size of the executable memory. This maximum size depends on the total size of the memory, i.e. of the executable and non-executable part of this memory. It is thus possible to have a large memory size, thus allowing use of large executable codes, while limiting the size of the executable part of the memory, which ensures good security and reduces the risk that an ill-intentioned person may access secret information contained in this memory.

BRIEF DESCRIPTION OF THE DRAWINGS

This invention and its advantages will be better understood with reference to the appended drawings and to the detailed description of a particular embodiment, wherein.

DETAILED DESCRIPTION OF THE INVENTION

The invention can be divided into two parts. A first part concerns the sending of the executable code to a receiving device, to which a security module is locally connected, this security module including a microcontroller and a memory. A second part concerns the execution of this code in the security module.

With reference to these figures, an embodiment of the process of the invention is described, wherein a "large size" executable code is sent to a receiving device. In particular, this includes a security module equipped with a microcontroller, the microcontroller being able to execute the code. The security module also includes a memory divided into two parts, namely an executable memory, from which the execution of the executable code is authorized, and a non-executable memory, from which the code execution is not allowed. In the context of the invention, "large size" means that the executable code is larger than the size of the executable memory or the executable memory available.

The present invention is also described in a Pay-TV context, the executable code being, for instance, an update code for the access to conditional access data. However, it should be noted that other applications could use the same process, these applications being all those wherein an executable code is sent in the form of messages to a microcontroller.

In the context of the invention, the executable code is sent in a message which can typically be a management message of the EMM type (Entitlement Management Message). Generally, these messages have either a fixed size or a maximum authorized size which cannot be exceeded, otherwise the message cannot be processed. This size is defined by the type of device or messages used and their standards.

Figure 1:
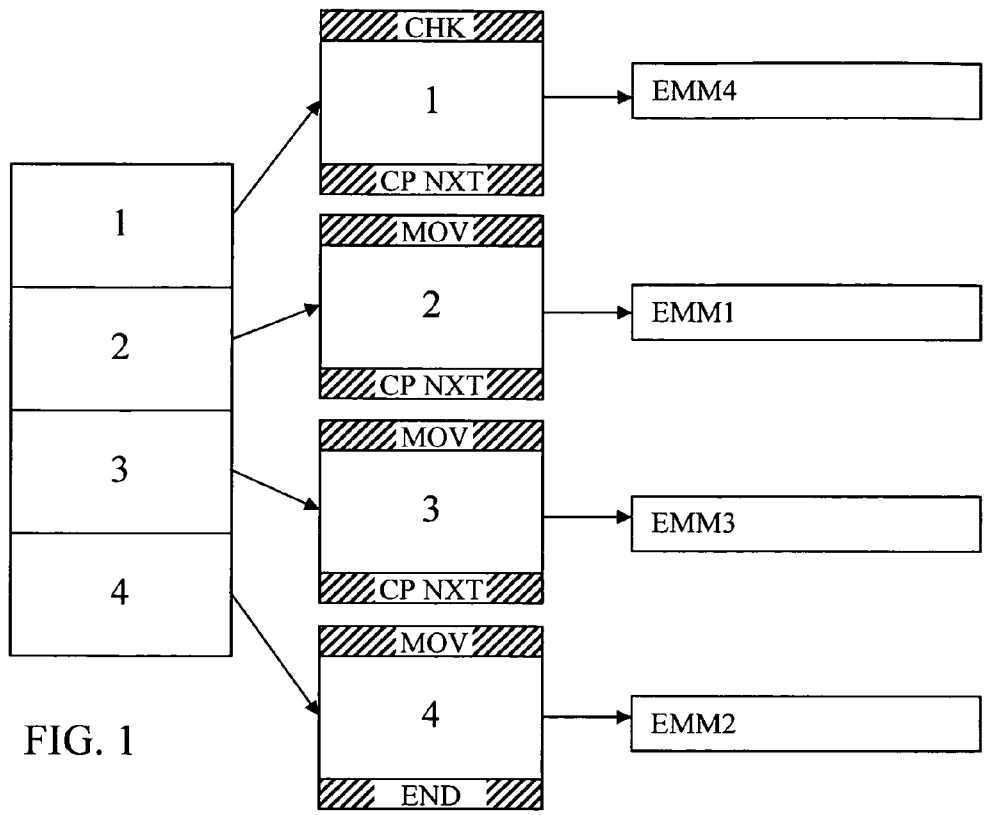
FIG. 1 represents a first step of the process of the invention, corresponding to the preparation for sending the executable code.
Figure 4:
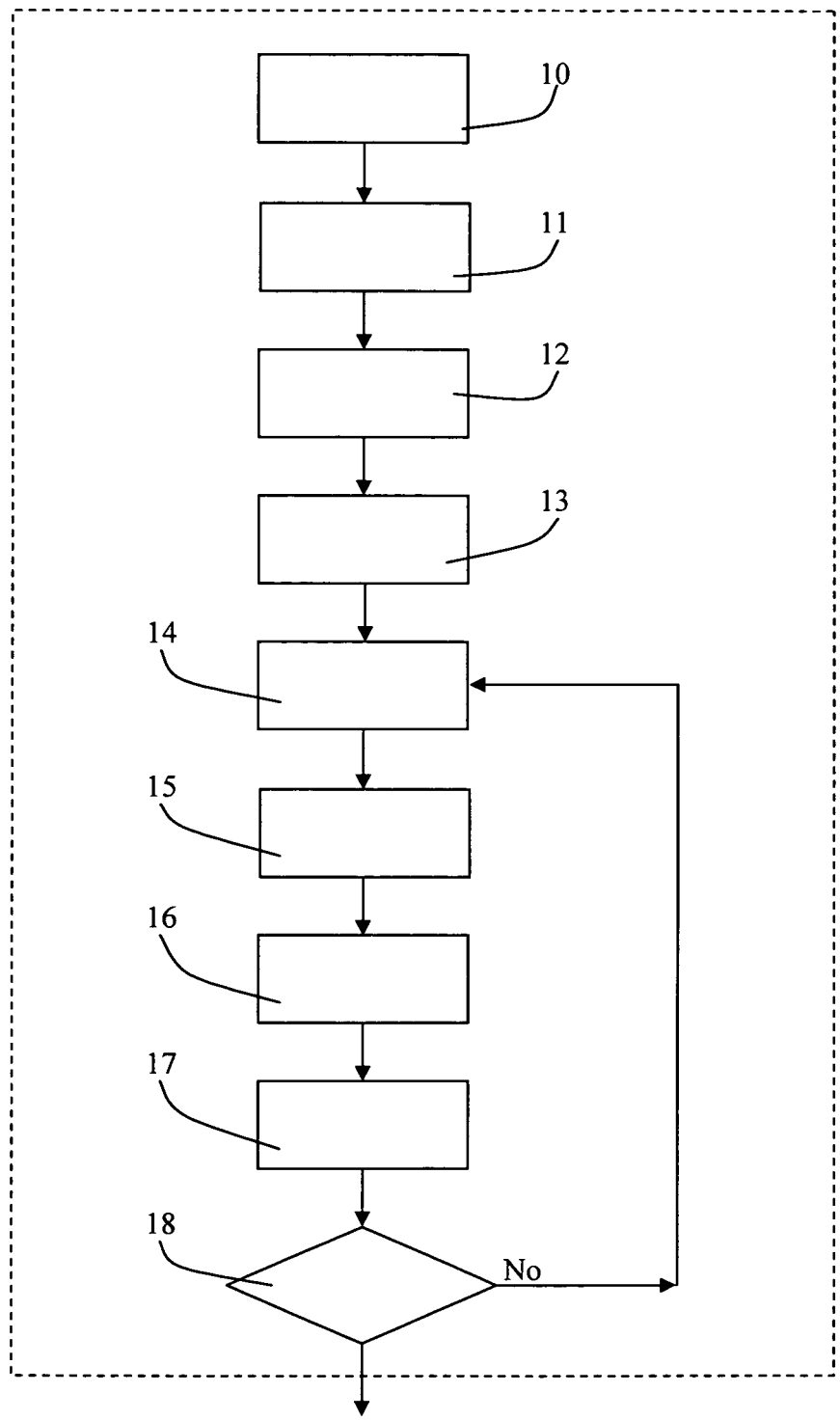
FIG. 4 represents, in the form of a block diagram, the process of sending the executable code according to this invention.

In a first step of the sending process of the invention, the complete executable code, such as represented on the left side of FIG. 1, and by the reference number 10 of FIG. 4, is divided into blocks having a size smaller than the maximum authorized size for a management message. According to a preferred embodiment, the size of a block is such that it is smaller than or equal to the size of the executable memory wherein this code is sent. Actually, the size of such a block is such that, when additional elements are added as explained below, the size of the block and added elements remains smaller than or equal to the size of the executable memory available. This step of separation into blocks is represented by the reference number 11 in FIG. 4.

The following step of this process consists in adding at least one block management code to each block. In practice, two management codes will be advantageously added, one of them being placed at the beginning of the block, and the other at the end of the block. The executable code block and the management block(s) are named below the extended block. The management codes can contain several instructions and be located in different places of the block or be different from one block to another. In particular, the management codes of the first block, i.e. of the block containing the start of the executable program, are in principle different from the management codes of the last block, i.e. of the block containing the last instructions of the program. The blocks comprised between the first and last blocks can all be identical or different from one another.

For example, the first block can contain a CHK management code for the verification of the authenticity and/or integrity of the block or the whole program. The operation of this verification is explained in more detail below. The first block can also contain a management code formed by a CP NXT copy control of a following block, this control being also described below. The addition of management codes is represented by the reference number 12 in FIG. 4.

In a step 13 of FIG. 4, each extended block, i.e. containing an executable code and at least one management code, is processed in order to form an EMM management message. These messages, being ready, can be sent to the receiving device.

The management messages are sent in such a way that the message comprising the first block of the executable program, namely the block which should be executed as first, is sent as the last one. The order of sending of other blocks of the executable program has no importance. As a general rule, the EMM management messages are sent several times, in a cyclic way. It means that the notion of order is lost. The last message includes means for verifying the presence and integrity of other messages. If the result of this verification is positive, the process proceeds. Otherwise, it is necessary to wait to receive the missing messages during a following cycle of sending.

In a concrete embodiment represented in FIG. 1, the executable code of the invention is divided into four blocks, numbered from 1 to 4. Two management codes are added to each of the blocks, and then each block associated with its management codes is introduced into an EMM management message. The block 1 is introduced into the last message, namely the message named EMM4. The block 2 is, for instance, introduced into the message EMM1, the block 3 into the message EMM3 and finally the block 4 into the message EMM2.

When the executable code is sent to a microcontroller receiving device such as, for instance, a decoder associated with a security module, the authorization message EMM1 is sent as first. This corresponds to step 14 of FIG. 4. In the example chosen, this EMM1 contains the block 2 of the executable code. When the message EMM1 is received by the related device, it is processed in order to extract the content of the block 2 and the management codes it contains. This step corresponds to the reference number 15 in FIG. 4.

Figure 2G:
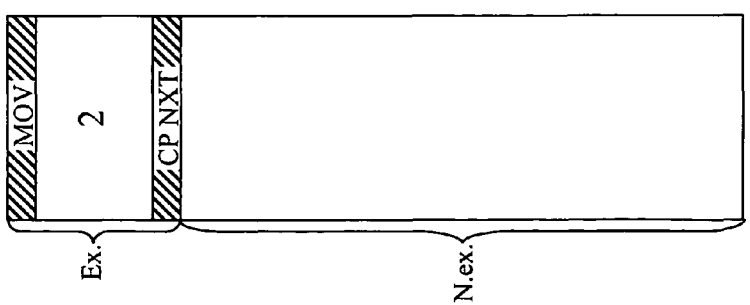
FIGS. 2a to 2g illustrate the state of the memory during the different steps of sending the code to be executed.
Figure 2F:
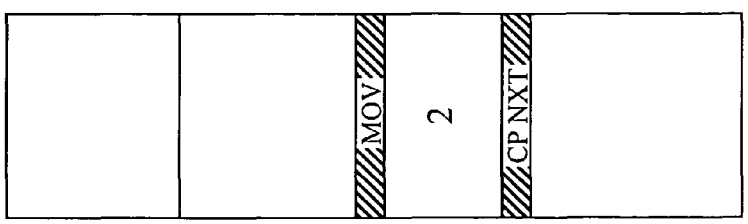
Figure 2E:
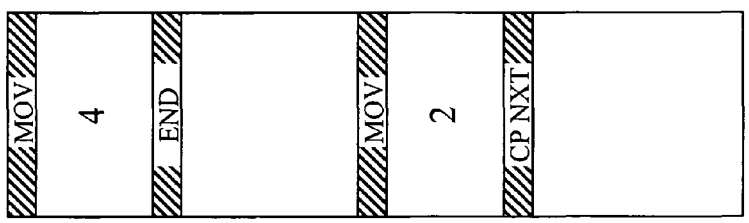
Figure 2D:
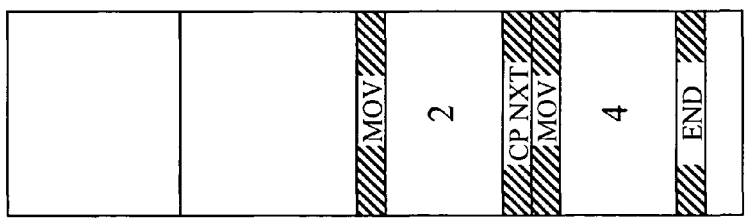
Figure 2C:
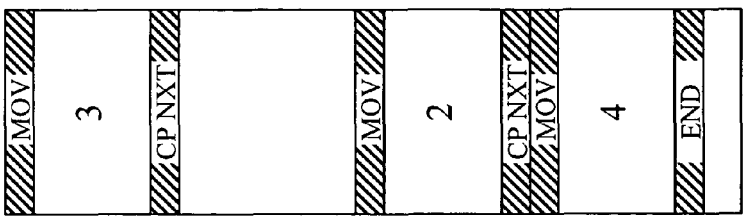

This content is stored in the executable part of the memory, the latter being the only one capable of receiving and processing such block. The recording of the content of block 2 in the executable memory corresponds to step 16 of FIG. 4. FIG. 2*a* shows the state of the memory after reception and storage of block 2.

In FIGS. 2*a* to 2*g*, the upper part, reference Ex., represents the executable memory. The lower part, reference N.ex., represents the non-executable memory or a part of this non-executable memory. Thus, in FIG. 2*a*, the executable part contains the block 2 with its management code, while the non-executable memory or at least one part of the latter, is empty and/or available.

In the following step, reference number 17 in FIG. 4, one of the management codes of block 2 is executed. This code, reference MOV in FIGS. 1 and 2, has the effect of transferring or copying the content of block 2 of the executable memory into the non-executable memory. The result of this operation is represented by FIG. 2*b*.

The location wherein a block is transferred can be defined beforehand at the time of preparation of the blocks corresponding to step 11. It can also be chosen according to the space available in the non-executable memory. Other means can also be conceived such as, for instance, the separation of the memory into areas having the size of an extended block. Each block is then placed in one of the areas reserved for this purpose.

Figure 2B:
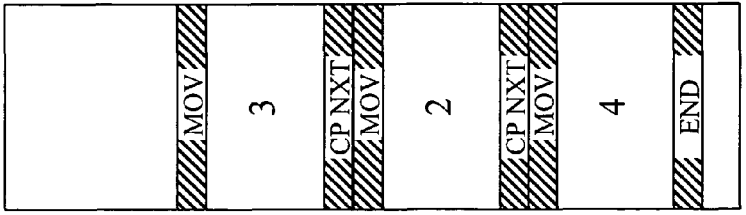
Figure 2A:
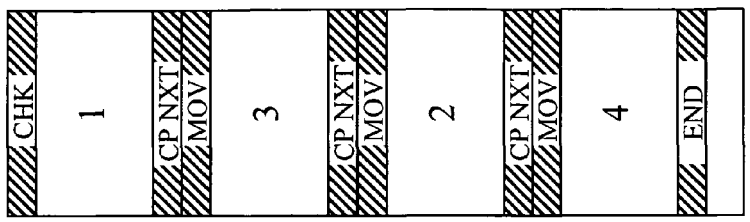

When the content of the executable memory has been transferred or copied, the latter is empty again or at least available, as schematically represented in FIG. 2*b*. The transfer of memory content is generally carried out by means of a copying operation. In the present description, the terms transfer and copy are considered as similar. A test is carried out in order to verify if the message sent is the last message. This test corresponds to step 18 of FIG. 4. In practice, the test of verification of the last message is not, in principle, performed by means of an external mechanism. On the contrary, the test is carried out by means of the management code of the message itself. As previously indicated, the test consists in verifying the presence of all the necessary messages, as well as their authenticity and/or integrity. In the following description, we suppose that the response to this test is negative, namely other messages should be sent.

The following management message (EMM2 in our example) is then sent to the receiver. This management message contains the executable code block 4 and the associated management codes. At the reception of the message, the program block is extracted, and then stored in the executable part of the memory. This is represented by FIG. 2*c*.

The content of the executable memory (block 4) is then transferred or copied into a non-executable area of the memory, thanks to the execution of a MOV part of the management code. FIG. 2*d* shows the case where the content of block 4 has been transferred to a given address of this memory.

The process proceeds in a similar way with the third management message EMM3, which contains the executable code block 3. This message is sent to the executable memory, as represented in FIG. 2*e*, then transferred into an empty space of the non-executable memory, as represented in FIG. 2*f*.

Then, the last message EMM4 is sent. This last message contains the first code block, reference number 1 in our example. This message is received by the receiver, and then processed in order to extract its content and store it in the executable part of the memory.

Unlike the other messages, this block does not contain a transfer control as management code. Thereby, the content of this block is not transferred to a non-executable area of the memory, but remains in the executable memory. The response to the test of step 18 of FIG. 4 is thus positive for block 1. The memory is like that shown in FIG. 2*g*.

Figure 5:
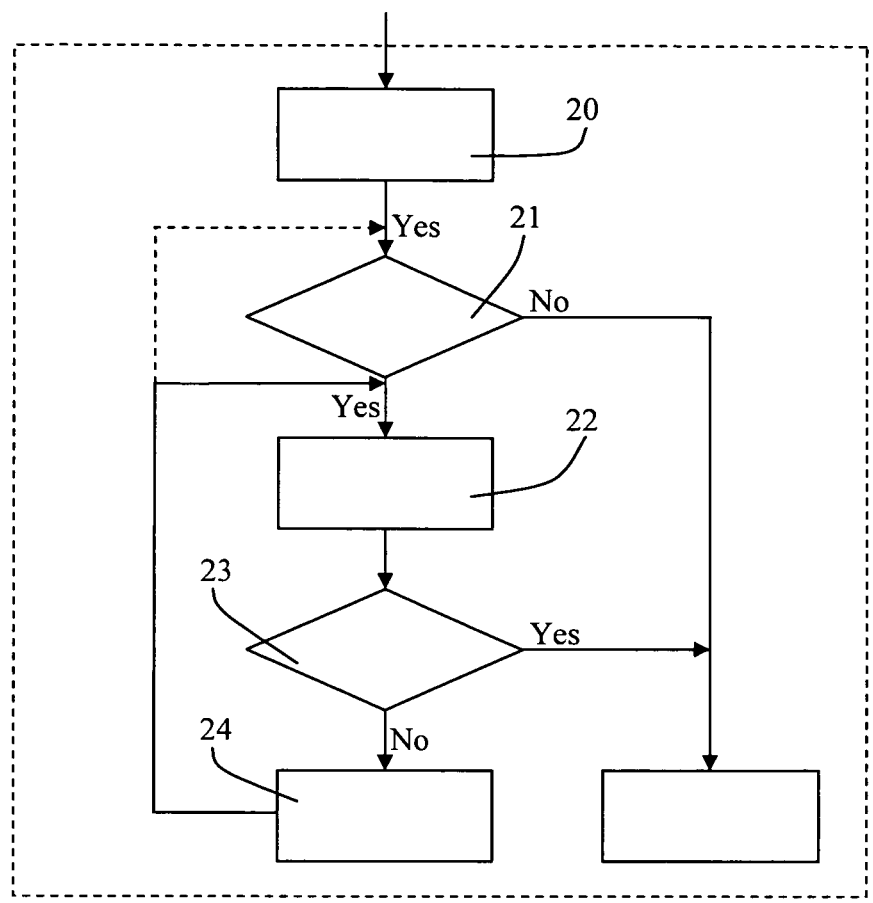
FIG. 5 shows the process of execution of the executable code according to this invention.

FIG. 5 represents the process for the execution of the executable code, which has been sent according to the above described sending process. FIGS. 3*a* to 3*d* represent the memory content during the different execution steps of the executable code.

Figures 3A, 3B, 3C, 3D:
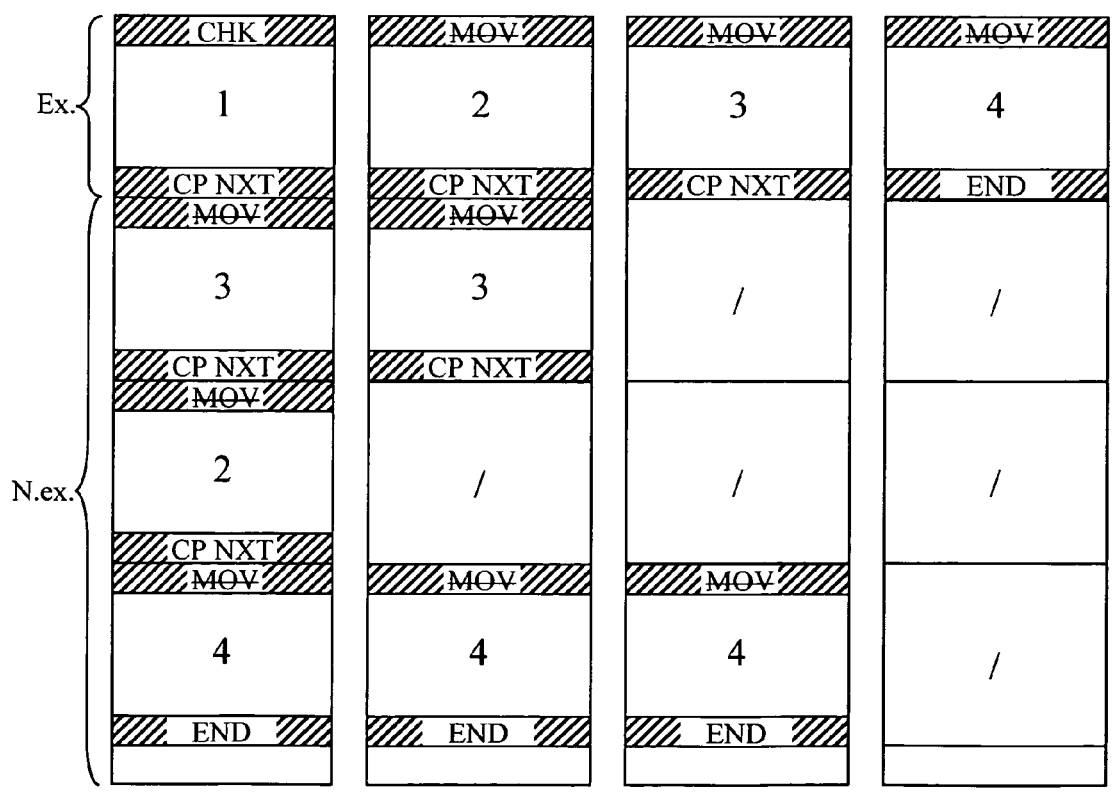
FIGS. 3a to 3d illustrate the state of the memory during the different steps of execution of the executable code.

The start of the execution process is represented by the reference number 20 in FIG. 5. The memory content is represented in FIG. 3*a*. It should be noticed that this content is identical to the content such as represented in FIG. 2*g*.

The executable memory contains the block 1 and its management codes. One of the management codes contains a set of CHK control instructions. The control instructions CHK are provided for the verification of the authenticity and/or integrity of the executable program or block of instructions. This verification can, for instance, calculate a signature or another figure of integrity created from the instructions related to the executable code of block 1 or set of blocks, the signature calculated being then compared to a signature contained in the block itself. It is clear that all kinds of other verification methods can be implemented in the context of the invention. The verification carries the reference number 21 in FIG. 5.

In practice, generally the integrity of the whole program, and not necessarily that of each block, is verified, although this second solution is not excluded. It is clear that, in principle, if one of the blocks is corrupted or absent, a verification on the whole program will be capable of detecting this error.

If the verification step is successful, the executable memory conventionally executes the instructions contained in block 1. This corresponds to step 22 of FIG. 5. When this execution is terminated, it is verified if the block contains an end indication as management code. This verification carries the reference number 23 in FIG. 5. In the following description, we suppose that the response to this test is negative. The management code placed at the end of the block 1 is read. This code includes copy instructions for the following CP NXT block. When this management code is executed, which corresponds to step 24 of FIG. 5, the content of the executable memory is replaced by the following block to be executed. In our example, the following block is block 2. The address where the following block has been placed can be contained in a table, in the previous block or can be found in any other suitable way, for instance by means of a block identifier.

The state of the memory after copying the block is represented in FIG. 3*b*. According to this figure, the executable memory contains the block 2. It is clear that transfer instructions, forming a part of the management code and placed at the beginning of this block, should not be executed. A solution consists in not copying the transfer instructions when copying the extended block of the executable memory to the executable memory. It is also possible to skip these instructions, for instance by means of a marker changing its status when the instructions have been executed a first time (during step 17 of FIG. 4). It is also possible to delete these instructions during the transfer of the block to the non-executable memory.

According to a particular alternative embodiment of the process of the invention, if the management code of block 2 contains an integrity authentication and/or verification code, the process returns to step 21 of FIG. 5, otherwise it returns to step 22.

The content of block 2 is thus executed during this stage, then it is verified if this block contains an end instruction.

The memory area which previously contained the block 2 can be empty or available. The block 1 is no longer present in the memory.

As before, the block 2 contains a CP NXT management code, which has the effect of copying the content of the following block in the executable memory.

FIG. 3c represents the state of the memory after copying this following block. Block 3, previously stored in the non-executable memory, is transferred to the executable memory. Block 2 is eliminated. The processing of block 3 is carried out as before, and ends by copying the last block 4 in the executable memory.

The code of block 4 is executed as before. The management code of this last block contains an end marker END. The end marker can, for instance, be an instruction returning the control of the execution of instructions to an operating system. At the end of the program, step reference number 23 in FIG. 5, this end marker or instruction will be detected, and the program will be terminated. The program may end by an erasing of the executable memory so that no part of the program remains stored and possibly accessible.

This invention is explained by means of an example, wherein the executable code is divided into four blocks. It is clear that the number of blocks can be different, and in particular much higher.

The kind of message used for the description of the invention is an EMM management message. Other types of message could also be used, in particular of the owner formats.

The management codes introduced into the blocks are used to manage the transfer of the instructions to the memory, both during the sending of the code and its execution. However, some management codes are not indispensable for the good running of the process. In particular, the codes relating to the authentication and/or verification of the integrity of the block content can be removed, this removal is however to the detriment of security and/or reliability.

The process of sending a code according to the invention has been described in one embodiment, wherein an executable code is sent at once, namely this code is completely processed before another executable code is sent. In practice, it is possible to send messages corresponding to several executable codes. As the messages are generally sent in a cyclic way, several blocks of several executable codes can be sent in overlapping periods. In this case, it is possible to add an identifier to the messages, which indicates to which executable code a given message belongs. These messages can be filtered so as to process only one executable code at once or, on the contrary, they can be stored in different locations of the memory.

According to the description of the present invention, the management codes are associated with executable code blocks in order to form extended blocks. In a particular embodiment of the invention, the management codes could be formed not by executable code, but simply by markers corresponding to a specific instruction. In this case, these markers are interpreted by the security module, which is suitable for executing the previously described operations, depending on the value of these markers.

Thanks to this process, it is possible, on the one hand, to provide an executable memory of small size, thus allowing to improve security by offering little space to a possible attack, and, on the other hand, to send and to execute large size programs without being limited by the size of the executable memory.

The invention claimed is:

1. A process for sending an executable code to a security module locally connected to a receiving device, this security module including a microcontroller and a memory, said memory including at least one executable area provided to contain instructions suitable to be executed by said microcontroller, and at least one non-executable area, wherein the microcontroller cannot execute the instructions, wherein the process comprises the following steps:
 a) dividing the executable code into blocks;
 b) adding at least one block management code to said blocks, in order to create an extended block, this extended block having a size at the most equal to that of the executable area of the memory, said at least one block of management code containing instructions executable by said microcontroller, the execution of said instructions being used to manage a transfer of the blocks to the memory;
 c) introducing the content of an extended block in a message of the type to be processed in the receiving device, in such a way that the whole executable code is contained in a plurality of messages;
 d) sending a message to the receiving device, this message containing one of the extended blocks different from the first extended block, the first extended block containing the start of the executable program;
 e) processing said message in order to extract its extended block;
 f) storing the executable code and said at least one management code of the block received in the executable area of the memory;
 g) executing at least one instruction included in the management code of said extended block, the execution of said at least one instruction included in this management code having the effect of transferring the content of the block into a non-executable area of the memory;
 h) repeating the steps d) to g) until all the extended blocks are stored in said non-executable area of the memory, except for the first block;
 i) sending a message containing the first extended block to the receiving device;
 j) processing said message in order to extract its extended block;
 k) storing the executable code of the block received in the executable area of the memory.

2. The process according to claim 1, wherein the messages sent are EMM management messages.

3. The process according to claim 1, wherein the messages are identical for a plurality of users.

4. The process according to claim 1, wherein the messages are different and unique for each user.

5. The process according to claim 1, wherein the size of the extended blocks is smaller than the size of the executable memory.

6. The process according to claim 1, wherein said instruction contained in the management code have at least one of the following effects: verification of at least one of authenticity and integrity of at least one executable code block; transfer or copy of the content of a block of the executable memory to the non-executable memory; transfer of the content of a block of the non-executable memory to the executable memory; program end marker; removal of a previously executed management code.

7. The process according to claim 1, wherein the management code is formed by at least one marker, and wherein the execution of the management code includes a step of execution of an executable code associated with this marker.

8. Receiving device configured to receiving an executable code sent according to the process of claim 1.

9. An execution process for the execution of an executable code by a security module locally connected to a receiving device, this security module including a microcontroller and a memory, said memory including at least one executable area provided to contain instructions suitable to be executed by said microcontroller, and at least one non-executable area, wherein the microcontroller cannot execute the instructions, said executable code being sent according to the process of claim 1, wherein the execution process includes the following steps:

a) execution of the executable code stored in the executable area of the memory;

b) execution of at least one instruction contained in one management code having the effect of transferring a block from the non-executable memory to the executable memory, this block being the block following the block under execution;

c) repetition of the steps a) and b) until the execution of the code is terminated.

10. The process according to claim 9, wherein the process further includes a step of verifying at least one of integrity and authenticity of the code prior to the first execution of the code stored in the executable area of the memory.

11. The process according to claim 9, wherein at least one of the blocks contains an execution end instruction, this instruction terminating the execution of the code.

12. Security module configured to execute an executable code according to the process of claim 8.

13. The process according to claim 10, wherein the process further includes a step of verifying at least one of integrity and authenticity of the code prior to the further executions of the code stored in the executable area of the memory.

14. The process according to claim 10, wherein the step of verifying at least one of the integrity and the authenticity includes a step of comparing at least one of a signature and integrity figure calculated according to the instructions to be executed and a signature stored in the block.

15. The process according to claim 13, wherein the step of verifying at least one of the integrity and the authenticity includes a step of comparing at least one of a signature and integrity figure calculated according to the instructions to be executed and a signature stored in the block.

16. Security module comprising;

a microcontroller; and a memory, said memory including at least one executable area provided to contain instructions suitable to be executed by the microcontroller of the security module, and at least one non-executable area, wherein the microcontroller cannot execute the instructions, wherein the microcontroller is configured to control operations including, a) execution of executable code stored in the executable area of the memory;

b) execution of at least one instruction contained in one management code having the effect of transferring a block from the non-executable memory to the executable memory, this block being the block following the block under execution;

c) repetition of the steps a) and b) until the execution of the code is terminated.

\* \* \* \* \*